March 17, 1936. G. F. BUTLER 2,034,084
CLOSURE FOR MEAT GRINDERS OR THE LIKE
Filed May 15, 1934

INVENTOR.
GEORGE FRANK BUTLER
BY Lippincott & Metcalf
HIS ATTORNEYS.

Patented Mar. 17, 1936

2,034,084

UNITED STATES PATENT OFFICE 2,034,084

CLOSURE FOR MEAT GRINDERS OR THE LIKE

George Frank Butler, Oakland, Calif.

Application May 15, 1934, Serial No. 725,735

4 Claims. (Cl. 146—182)

My invention relates to a closure for meat grinders or like apparatus and is especially adapted for the simultaneous protection of both inlet and outlet orifices of such apparatus.

Among the objects of my invention are: To provide a closure apparatus adapted to simultaneously cover or uncover the inlet and outlet openings of meat grinders or similar apparatus; to provide a detachable closure apparatus for closing inlet and outlet openings of meat grinders or the like; to provide a closure for meat grinders wherein inlet and outlet apertures may be simultaneously covered or uncovered with a single application of exterior force; to provide a closure apparatus for meat grinders and the like having an extensible frame thus adapting the closure to grinders of varying sizes; and to provide a closure device for meat grinders or the like wherein covers for inlet and outlet openings are resiliently held in either open or closed position.

Other objects of my invention will be apparent or will be specifically pointed out in the description forming a part of this specification, but I do not limit myself to the embodiment of the invention herein described, as various forms may be adopted within the scope of the claims.

Referring to the drawing.

Figure 2:
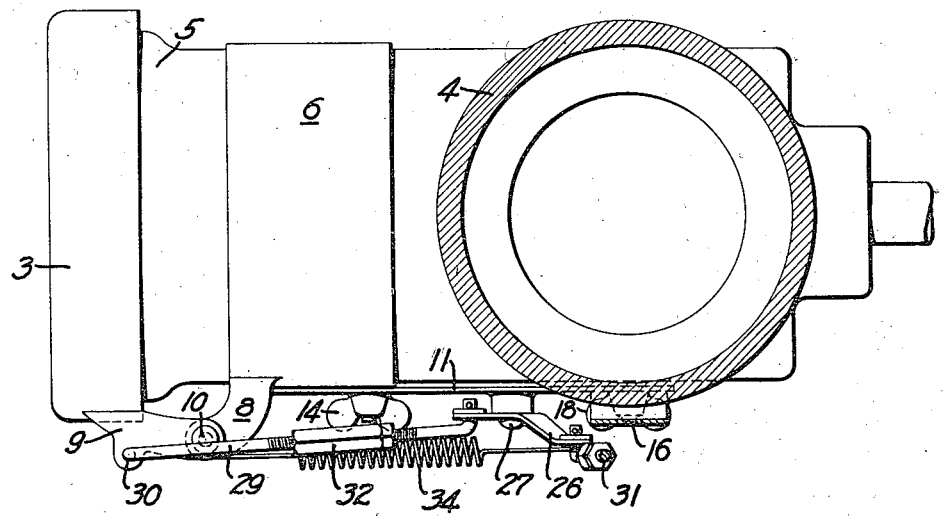
Figure 2 is a view partly in section and partly in elevation, taken as indicated by the line 2—2 in Figure 1.
Figure 1:
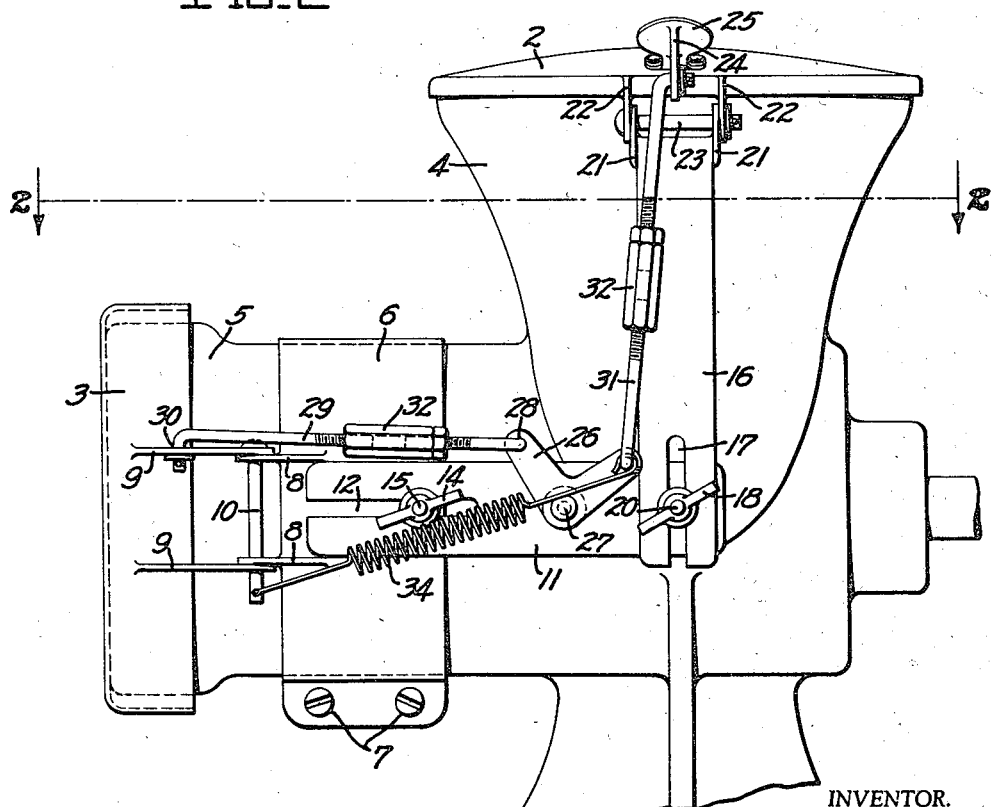
Figure 1 is a side elevational view of my invention as applied to a conventional meat grinder.

Meat grinders as commonly set up for use are not provided with covers and recourse is sometimes had to improvised closures of one sort or another such as cloth, wooden blocks or similar devices. More frequently, however, no arrangement whatsoever is used to prevent dirt, insects or other unwanted objects from getting into the grinder when standing idle. For sanitary reasons a closure is desirable which will function to close both the inlet and outlet openings. It is also highly desirable that the covers for the inlet and outlet openings be simultaneously opened or closed in one operation with pressure applied at one point only, and it is advantageous to have tension applied to the covers in such a manner that the device is kept tightly closed when closed, and also firmly maintained in open position when open.

The broad aspect of my invention may be more clearly understood by reference to the drawing, which shows one preferred form of my invention as applied to a conventional meat grinder having an inlet opening in a horizontal plane and an outlet opening in a vertical plane on one side of the device. An inlet cap 2 and an outlet cap 3 is provided, the former fitting over the hopper 4 of the meat grinder proper and the latter covering the discharge end 5 having therein the outlet opening. It is quite obvious that the contours of both the inlet and the outlet caps may be so arranged as to fully protect the respective openings and prevent dust or other contaminating matter from entering the cavity of the grinder. A split band 6 encircling the body of the grinder and frictionally secured thereto by a suitable screw clamp arrangement 7 is provided with a hinge on which is pivoted the cap 3. The hinge is formed by extending arms 8 from the split band and extending cooperating arms 9 from the cap 3, the two sets of arms being linked together by means of a hinge pin 10.

Extending horizontally along the side of the grinder is a lateral support member 11 provided with a horizontal slot 12 which passes under a wing nut 14 threaded on a bolt 15 extending from the split band. This slot provides for horizontal extension of the lateral support member, and the member may be locked in place by means of the wing nut. A vertical support member 16 is similarly provided on its end with a vertical slot 17 and is locked to the horizontal support member by a vertical wing nut 18 threaded on a frame stud 20 adjacent the end of the horizontal support member. Vertical adjustment and locking is accomplished by means of the bearing of the wing nut on the slot sides.

The upper end of the vertical support member is provided with a pair of vertical frame arms 21 which hinge with a pair of cap arms 22 fastened to the cap 2. The entire set of arms is held together and pivoted by means of an inlet hinge bolt 23.

It may thus be seen that as far as the support frame for the closure is concerned that when the clamp is properly positioned on the grinder and the proper adjustments made of the frame and locked by the two wing nuts, that the caps can be located in the proper position to close and protect both the inlet and the outlet openings.

As it is desirable that the two covers or caps operate simultaneously, I prefer to provide a mechanical linkage between them. This is preferably accomplished by providing the inlet cap 2 with an operating arm 24 having an extended surface adapted for hand or thumb pressure. This arm extends across the hinge of the cap so that downward pressure thereon will open the cap. I then prefer to provide the horizontal support arm with a V-shaped bell crank 26. This bell crank is pivoted in the center of the V on a bell crank stud 27 and the end of the arm nearest the outlet cap is provided with an operating rod aperture 28. I pass one end of an operating rod 29 through this aperture, the other end passing through a similar rod aperture 30 in the outlet hinge arm 9. The ends of the rod are retained in place by means of the usual cotter keys or similar devices. I then connect the other arm of the bell crank with the operating arm 24 by means of a second operating rod 31 passing through apertures in the bell crank arm and operating arm, and held in place at its ends by the usual cotter keys.

In order that these operating rods be adjustable as to length in accordance with the adjustment of the support frame members, I prefer to split each rod into two parts and provide each one of them with an adjustment device 32 whereby the rods may be lengthened or shortened in accordance with the chosen length of frame.

It will thus be seen that the two caps are linked together and that when the inlet cap is opened the mechanical linkage through the medium of the bell crank will also open the outlet cap.

As it is preferable that there be pressure applied to keep the caps tightly closed when they are in closed position and to maintain them firmly open when in open position, I prefer to apply spring tension between the bell crank and a stationary point on the closure frame to accomplish this purpose. I therefore insert one end of a spring 34 in the end of the hinge pin 10, the end of the spring acting as a retainer for the hinge pin. I then bend the spring to terminate at the end of the rod 31 where it passes through the bell crank arm. I prefer to locate the two end anchors of this spring so that when the device is closed the spring axis passes slightly to one side of the pivot 27 of the bell crank, and when the caps are open the movement of the bell crank will pass the axis of the spring across the crank to the other side of the pivot. Thus, when the cap is in either open or closed position the full force of the spring is applied to keep it in that particular position.

While I have described my device as applied to a meat grinder, its adaptation to other similar devices will be obvious to those skilled in the art. It is also obvious that the frame may be adjusted to care for openings which depart from a right angular relationship.

I claim:

1. A closure for meat grinders or the like having an upper inlet opening and a side outlet opening, comprising in combination a clamp adjacent said outlet opening for fastening said closure to said grinder, an outlet cover pivoted to said clamp and swinging laterally, a horizontal support member slidable on said clamp, a vertical support member slidable on said horizontal member, means for locking said members in fixed relationship, an inlet cover pivoted on the end of said vertical member, and means adjustable to the relative position of the covers for connecting said covers for simultaneous operation.

2. A closure for meat grinders or the like having an upper inlet opening and a side outlet opening, comprising in combination a clamp adjacent said outlet opening for fastening said closure to said grinder, an outlet cover pivoted to said clamp and swinging laterally, a horizontal support member slidable on said clamp, a vertical support member slidable on said horizontal member, means for locking said members in fixed relationship, an inlet cover pivoted on the end of said vertical member, means adjustable to the relative position of the covers for connecting said covers for simultaneous operation, and means for resiliently holding said covers in either open or closed position.

3. A closure for meat grinders or the like having an upper inlet opening and a side outlet opening, comprising in combination a clamp adjacent said outlet opening for fastening said closure to said grinder, an outlet cover pivoted to said clamp and swinging laterally, a horizontal support member slidable on said clamp, a vertical support member slidable on said horizontal member, means for locking said members in fixed relationship, an inlet cover pivoted on the end of said vertical member, a bell crank pivoted on said horizontal support member, adjustable operating rods extending from said bell crank to each of said covers whereby said covers will open and close simultaneously, and a single means for maintaining said covers in open or closed positions.

4. A closure for meat grinders or the like having an upper inlet opening and a side outlet opening, comprising in combination a clamp adjacent said outlet opening for fastening said closure to said grinder, an outlet cover pivoted to said clamp and swinging laterally, a horizontal support member slidable on said clamp, a vertical support member slidable on said horizontal member, means for locking said members in fixed relationship, an inlet cover pivoted on the end of said vertical member, a bell crank pivoted on said horizontal support member, adjustable operating rods extending from said bell crank to each of said covers whereby said covers will open and close simultaneously, and a spring attached to one arm of said bell crank and extending across the pivot thereof to a fixed position on said closure for applying stress to said covers when in either open or closed position.

GEORGE FRANK BUTLER.